(12) United States Patent
Perry et al.

(10) Patent No.: US 6,954,203 B2
(45) Date of Patent: Oct. 11, 2005

(54) MODELING AND COMBINING MULTIPLE GRAPHICS OBJECTS

(75) Inventors: Ronald N. Perry, Cambridge, MA (US); Sarah F. Frisken, Cambridge, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 669 days.

(21) Appl. No.: 09/810,977

(22) Filed: Mar. 16, 2001

(65) Prior Publication Data

US 2002/0130857 A1 Sep. 19, 2002

(51) Int. Cl.$^7$ .......................... G06T 17/00; G09G 5/00
(52) U.S. Cl. ...................... 345/420; 345/428; 345/581
(58) Field of Search ............................ 345/420, 422, 345/428, 427

(56) References Cited

U.S. PATENT DOCUMENTS

| | | | | |
|---|---|---|---|---|
| 5,251,160 A | * | 10/1993 | Rockwood et al. | 364/578 |
| 5,740,076 A | * | 4/1998 | Lindbloom | 364/514 |
| 9,810,762 | * | 9/2002 | Perry et al. | 345/420 |
| 6,480,190 B1 | * | 11/2002 | Pfister et al. | 345/419 |

OTHER PUBLICATIONS

Hoff III and Zaferakis and Lin and Manocha, Fast and simple 2D Geometric Proximity Queries Using Graphics Hardware, Jan. 1, 2001, ACM 2001 1–5813–292, pp. 145–149.*

Frisken et al., "Adaptively Sampled Distance Fields: A General Representation of Shape for Computer Graphics", Proceedings for SIGGRAPH 2000, pp. 249–254, 2000.

Breen et al.; "A Level–Set Approach for the Metamorphosis of Solid Models", to be published in IEEE Transactions on Visualization and Computer Graphics, 2001.

Lazarus et al., "3D Metamorphosis: a Survey", The Visual Computer, vol. 14, Issue 8/9 (1998) pp. 373–389.

* cited by examiner

Primary Examiner—Kent Chang
Assistant Examiner—Scott Wallace
(74) Attorney, Agent, or Firm—Dirk Brinkman; Andrew J. Curtin

(57) ABSTRACT

A method models a plurality of graphics models by generating a first adaptively sampled distance field for a first model, and generating a second adaptively sampled distance field for a second model. Locations in the first adaptively are sampled distance field to determine a distance value for each location. The second adaptively sampled distance field is sampled at each location to determine a corresponding feature of the second adaptively sampled distance field. Then, each distance value is modified according to the corresponding feature to determine a second distance value for each location.

10 Claims, 6 Drawing Sheets

| Triangles | Cow | Triangles | Bunny |
|---|---|---|---|
| 12 | <10ms | 502 | <10ms |
| 868 | <10ms | 2192 | 10ms |
| 2010 | 10ms | 21878 | 40ms |
| 5202 | 10ms | 69790 | 130ms |
| Triangles | CSG Object | Triangles | Hand |
| 552 | <10ms | 12807 | 20ms |
| 1848 | 10ms | 49866 | 90ms |
| 22584 | 40ms | 197854 | 360ms |
| 202564 | 360ms | 541850 | 930ms |

FIG. 3

MODELING AND COMBINING MULTIPLE GRAPHICS OBJECTS

RELATED APPLICATION

U.S. patent application Ser. No. 09/810,983 "System and Method for Generating Adaptively Sampled Distance Fields with Bounded Distance Trees" filed by Perry et al. on Mar. 16, 2001; U.S. patent application Ser. No. 09/810,839 "Conversion of Adaptively Sampled Distance Fields to Triangles" filed by Frisken et al. on Mar. 16, 2001; U.S. patent application Ser. No. 09/811,010 "System and Method for Modeling Graphics Objects" filed by Perry et. al. on Mar. 16, 2001; and U.S. patent application Ser. No. 09/810,762 "Modeling Graphics Objects with Topological Hints" filed by Perry et. al. on Mar. 16, 2001.

FIELD OF THE INVENTION

This invention relates generally to the field of computer graphics, and more particularly to modeling and combining multiple graphics objects.

BACKGROUND OF THE INVENTION

Prior art hardware and software for graphic modeling systems are predominantly designed to store, manipulate, and render models that are represented by polygons, e.g., triangles. Despite technical advances, hardware and software continue to have limits in the number of polygons they can store and process interactively. These limits depend on the requirements of each specific application. Applications that require quality images, such as movies and medicine, may require a large number of polygons, while other applications, for example, those designed for portable devices, are constrained to using a small number of polygons due to processing and memory limitations. Applications that require views of the same model at varying distances, for example, games, can require any number of polygons, depending on their position in a scene.

A number of methods are known for transforming complex objects into level-of-detail (LOD) models having various resolutions. Lower resolution models are simpler expressions of the input model. LOD models represent the input object with varying accuracy and geometrical complexity. LOD methods typically process a subset of the available geometrical representations, e.g., points, polygons, Bezier patches, non-uniform rational B-splines (NURBS), volumes, implicit surfaces, and CSG models, and usually generate a triangle mesh that can be rendered by standard rendering engines.

Several of the known methods perform a sequence of transformations which provide various LOD representations of the model, including an initial representation, intermediate representations, and a final output mesh of triangles. LOD models should allow smooth interpolation between representations at differing resolutions. However, many of these methods exhibit discontinuities during interpolation, and perform poorly, if at all, at lower resolutions due to compounded errors caused by repeated transformations.

Many three dimensional models are acquired by using techniques such as laser range scanning, or imaging techniques, for example, magnetic resonance imaging (MRI) and computerized tomography (CT), to generate models with a high level of detail. Representing these highly detailed models may require the system to generate millions of triangles. To then render these triangles in real-time, as required by games and medical applications, is impractical with current hardware and software methods.

Automatic modeling methods are known that generate meshes of given sizes (resolution) from the model's input geometry, usually polygons. For a survey of available methods see Garland, "*Multiresolution modeling: Survey & future opportunities,*" Eurographics State of the Art Reports, pp. 111–131, 1999, and Heckbert et al. "*Survey of polygonal surface simplification algorithms,*" Multiresolution Surface Modeling Course, SIGGRAPH '97, 1997.

Because arbitrary polygons can always be decomposed into triangles, a simple mesh consists only of triangles. Garland notes that modeling systems that simplify the model can be split into two types: refinement and decimation methods. Refinement methods take a simplified representation of the model's geometry, and add to the simplified representation where it is inadequate. Decimation methods are the conceptual opposite of refinement. Elements of the model are iteratively removed until the desired level of resolution is reached.

Due to better performance, refinement models tend to be the more popular choice in applications such as curve approximation. However, in order to apply the refinement methods to an original polygonal model, it is necessary to have a base mesh, which is a simplification of the original model, yet retains the exact same topology. Generating the base mesh can be complicated, leading to the use of decimation methods.

Vertex clustering, as described by Rossignac et al. in "*Multi-resolution 3D approximations for rendering complex scenes,*" Modeling in Computer Graphics: Methods and Applications, pp. 455–465, 1993, is one decimation method that quickly simplifies mesh models. In its simplest form, vertex clustering partitions the initial geometry into cells for a given level of detail, and clusters all the vertices that lie within each cell together. New triangles are formed by replacing each vertex in the original mesh with its cluster in the new mesh. Degenerate triangles are removed where two or more of the vertices of an input triangle map to the same cluster. Although vertex clustering is fast, no attempt is made to preserve topology. This can lead to poor quality approximations of the simplified model, especially when the final number of polygons is much smaller compared to the number of polygons in the input mesh. An additional disadvantage of the vertex clustering method is that the entire decimation process must be restarted for a different resolution.

Several similar techniques avoid the need for restarting by iteratively performing an operation on the polygon mesh until the desired level of simplification has been reached, for example see Heckbert et al. "*Optimal triangulation and quadric-based surface simplification,* Computational Geometry, 14:49–65, 1999, Hoppe et al. "*Mesh optimization,*" Proceedings of SIGGRAPH '96, pp. 19–26, 1996, Lindstrom et al. "*Fast and memory efficient polygonal simplification,*" Proceedings of IEEE Visualization '98, pp. 279–286, 1998, and Schroeder et al. "*Decimation of triangle meshes,*" Proceedings of SIGGRAPH '92, pp. 65–70, 1992.

These methods generate a progression of polygon meshes, permitting different resolutions to be generated without starting from scratch. At each stage of the simplification process, the choice of which polygons to decimate depends on the amount of error that can be tolerated. The choice of the error metric leads to a trade-off between accuracy and efficiency. Accurate error metrics compare the approximated model with the original model to provide better quality meshes, at the cost of increased processing time, see Hoppe et al., "*Mesh optimization,*" Proceedings of SIGGRAPH '96, pp. 19–26, 1996, Popovic et al., "*Progressive Simplical Complexes,*" Proceedings of SIGGRAPH '97, pp. 217–224, 1997. Efficient error metrics, such as a quadric error metric, provides very fast decimation, but compound any errors during each iteration, see Garland et al. "*Surface simplification using quadric error metrics,*" Proceedings of SIGGRAPH '99, pp. 209–216, 1999.

Schroeder et al. iteratively removes vertices from the input mesh, one at a time. Damaged triangles are removed, and resultant holes are re-triangulated after projecting a local surface onto a plane. This introduces a restriction to manifold surfaces.

Other methods focus on vertex pair contraction. There, pairs of vertices are combined. The methods Garland et al., Lindstrom et al., and Hoppe are examples of vertex pair contraction. Edge contraction methods only combine the vertices connected by an edge, and remove the triangles that share the same edge. These methods preserve the topology of the model in the approximations. The more general case of vertex pair contractions, where the pair of vertices does not have to be connected, and make no effort to preserve topology. Although this can be beneficial, it can sometimes lead to poor decisions because arbitrary parts of a model are stitched together.

Gopi et al., in "*Simplifying spline models,*" Computational Geometry, 14:67–90, 1999, describe a technique for generating level-of-detail models composed of triangular Bezier patches. These curved level-of-detail (C-LOD) models can be generated from input spline patches. Their technique can also apply a series of transformations to the existing geometry, e.g., diagonal swapping, vertex removal, or patch merging. However, that method is limited to working with spline patches, although the resulting Bezier patches can be converted to triangles, either statically or dynamically.

All of the methods described above, except for vertex clustering, work by iteratively applying one or more transformations to the input mesh to generate one or more level-of-detail meshes. The methods are limited to using the geometry of the input mesh to measure the error introduced by the simplification process. The methods can also be sensitive to the original discretization of the geometry, i.e., input vertex placement.

Due to the refining nature of these methods, the time required to generate an approximation is dependent upon the size of the input mesh. For example, Hoppe's method requires about an hour to simplify a model with 70,000 polygons, and would require a significantly longer time for larger models. Although Garland's method is significantly faster, it produces low quality LOD models due to compounded error. None of the prior art approaches are practical for real-time applications, especially when the models are comprised of millions of polygons, as is the case for scanned models. Furthermore, the prior art methods produce low quality models when the polygon count is low, as is required for games.

Therefore, there is a need for a modeling system that can work on arbitrary input data, that does not compound errors, that can process models in real-time, that produces good models when the polygon budget is low, that is independent of the input vertex placement, and that can be used in conjunction with existing decimation methods.

SUMMARY OF THE INVENTION

The present invention provides a unified method for modeling objects represented by a wide selection of input geometries. The present method, unlike prior art methods, enable the user to modify the model in real-time. The user can select the required level-of-detail, and the topological and geometrical features important in the model. The method can also use topological hinting. With topological hinting, the user generates one or more simple constructive solid geometry (CSG) models, which defines the ideal topology for a given simplification.

The hint models can be combined or "blended" with the original model to provide blended models having better quality than can be obtained by prior art methods, particularly at low resolutions. The user is able to intuitively make the important and difficult cognitive decisions that are required when building low resolution approximations of complex models.

The present method uses adaptively sampled distance fields (ADFs) to represent the geometry of the input object. ADFs provide several advantages unavailable to other techniques. Specifically, continuous surface representations can be reconstructed from the ADF, thereby allowing smooth interpolation between representations of the model at different levels-of-detail. The hierarchical structure of the ADF provides efficient access to surface representations of varying resolutions. Error bounds can be quickly determined directly from the ADF so that repetitive transformations do not accumulate errors and reduce the quality of the model. Because ADFs can be generated from a wide variety of input forms such as triangles, implicit functions, CSG models, and Bezier patches, they are a unifying structure for the simplification and modeling of geometry. Finally, the ADF achieves accurate polygon vertex placement, and accurate normals.

The invention can be used in a wide range of applications, ranging from medicine to animation to games, and on various sized hardware platforms including high performance graphics compute servers, complex graphics workstations, and hand-held devices.

A method according to the invention models a plurality of graphics models by generating a first adaptively sampled distance field for a first model, and generating a second adaptively sampled distance field for a second model. Locations in the first adaptively are sampled to determine a distance value for each location. The second adaptively sampled distance field is sampled at each location to determine a corresponding feature of the second adaptively sampled distance field. Then, each distance value is modified according to the corresponding feature to determine a second distance value for each location.

BRIEF DESCRIPTION OF THE DRAWINGS

FIG. 3 is a table of timing results for model simplification according to the invention;

DETAILED DESCRIPTION OF THE PREFERRED EMBODIMENT

System Overview

Figure 1:
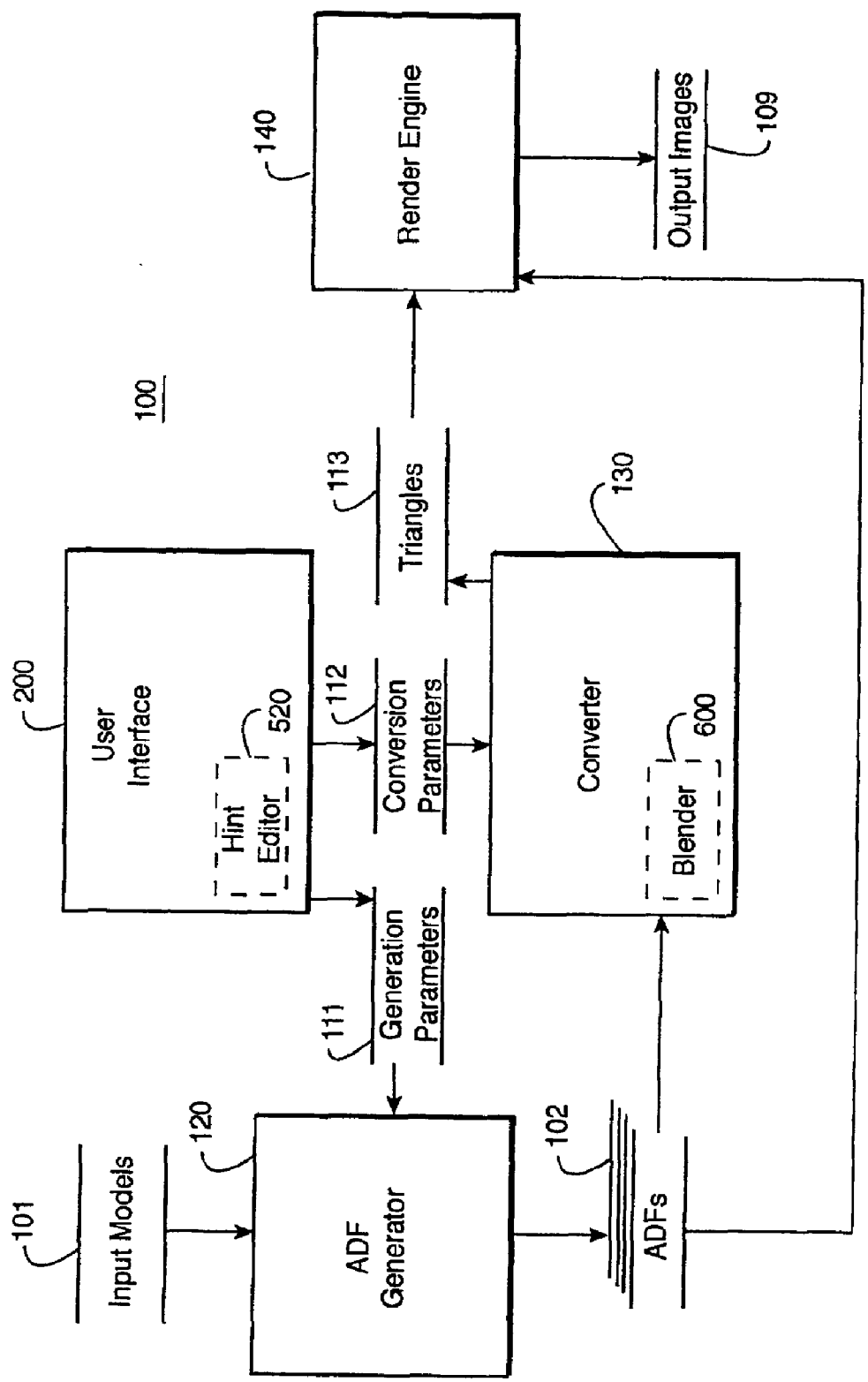
FIG. 1 is a dataflow diagram of an interactive modeling system according to the invention.

Our invention provides a method and system for interactively transforming computerized models with simple controls. The user can select important topological features, and provide geometric hints to guide the modeling process at variable levels-of-detail. The invention also allows the user to blend models having different levels of resolution, and perhaps different shapes, while minimizing error, and maximizing quality in the final result.

Adaptively Sampled Distance Fields

In the preferred embodiment, we represent the input model, having any number of dimensions and a fixed level-of-detail, by an adaptively sampled distance field (ADF). The basic data structure of the ADF is described in U.S. patent application Ser. No. 09/370,091 "Detail-Directed Distance Fields" filed by Frisken et al. on Aug. 6, 1999, incorporated herein in its entirety by reference.

There, the ADF data structure is introduced, basic methods for generating, rendering, and modifying the ADF are described, and a number of applications where the ADF can be used are listed. As an advantage, ADFs store only as much data as required to represent the detail in an object.

Classically, a distance field can be represented as distances, stored in a memory as scalar values. The scalar values specify minimum distances to surfaces of an object. When the distances are signed, the sign can be used to distinguish between the inside and outside of the object. Zero distance values represent the surfaces.

The ADF can be generated by adaptively sampling the model's shape, and storing the sampled distance values in a spatial hierarchy, such as a 2D quadtree or a 3D octree, for efficient processing.

When using an octree-based ADF for 3D models, distance values are stored at the corner vertices of cubical cells. When using a quadtree-based ADF for 2D models, the distance values are stored at the corner vertices of square cells. If the reconstructed distance field derived from the distances at the corners of the cell does not adequately represent the true distance field, the cell is subdivided into four or eight identical child cells. This process is repeated until a maximum subdivision level is reached or a predefined error tolerance is satisfied. Due to its hierarchical nature, the ADF provides a powerful data structure for level-of-detail modeling, as described below.

Distances at arbitrary points in the ADF can be reconstructed from the sampled values, and used for computerized processing such as modeling, and rendering. Our use of adaptive sampling permits high sampling rates in regions of fine detail, and low sampling rates where the distance field varies smoothly. Thus, the ADF enables high accuracy modeling without excessive memory requirements.

ADFs provide a number of advantages when used as the representation of an object's shape while performing user-guided modeling. Continuous surface representations can be reconstructed from the ADF, thereby allowing smooth interpolation between representations of the model at different levels-of-detail. The hierarchical structure of the ADF provides efficient access to surface representations of varying resolutions. Error bounds can be quickly performed directly from the ADF so that repetitive transformations do not accumulate errors and reduce the quality of the model.

Because ADFs can be generated from a wide variety of input forms such as triangles, implicit functions, CSG models, and Bezier patches, they are a unifying structure for the simplification and modeling of geometry. The ADF achieves accurate polygon vertex placement, and accurate normals. Following the distance gradient enables automatic positioning of vertices of the polygons on the surface of the model.

User Guided Modeling System Structure and Operation

FIG. 1 shows the structure of the user guided modeling system 100 according to our invention. The system includes a user interface 200, an ADF generator 120, a converter 130, and a render engine 140. Optionally, the user interface 200 can also include a topological hint editor 520, and the converter 120 can include a blender 600.

Input to the system 100 is data representing input models 101, typically complex. Specific input models 101 can be selected by the user interface 200 with generator parameters 111. The input models 101 can be represented by range data, scanned data, polygons (triangles), implicit functions, CSG models, Bezier patches, and the like. Of course, the input models 101 can also include a previously generated ADF, for example, a model previously produced by the topological hint editor 520. Generally, the input models have a fixed level-of-detail.

The ADF generator 120 generates ADFs 102 from the input models 101 according to the generator parameters 111. The ADF generator is described by Perry et al. in "System and Method for Generating Adaptively Sampled Distance Fields with Bounded Distance Trees," see above.

If the topological hint editor 520 is used, the ADF is generated accordingly. It should be noted that at any one time, the system 100 can concurrently work on multiple ADFs.

Using conversion parameters 112, the converter transforms the ADFs 102 to input 113 suitable for the render engine, e.g., triangles. The converter can also "blend" 600 two or more ADFs 102 to produce a new ADF that is a combination of the input ADFs.

The render engine 140 operates on either the triangles 113 produced by the converter 130, or directly on the ADFs 102. In any case, the render engine 140 produces output images 109.

Due to the hierarchical nature of the ADF, the output images 109 can be generated at interactive rates, typically, in less than a second for each image, and for low level-of-detail images in less than 100 milliseconds. Frame rates of 30 or 60 frames per second can also be achieved for the variable levels-of-detail. This allows the user to modify the parameters 111–112 and immediately receive feedback in realtime, unlike prior art polygon based modeling systems.

With our system, the user can select the maximum level of the ADF to be traversed, a maximum acceptable error bound within each of the ADF cells, and which cells of the ADF cells are used to generate the triangle mesh. As the model is modified interactively, the user is presented with an accurate representation of the input model, and an output approximation of the simplified or blended model for comparison from different viewpoints to enable selection of parameters according to a desired level of visual quality.

User Interface Structure

Views

Figure 2:
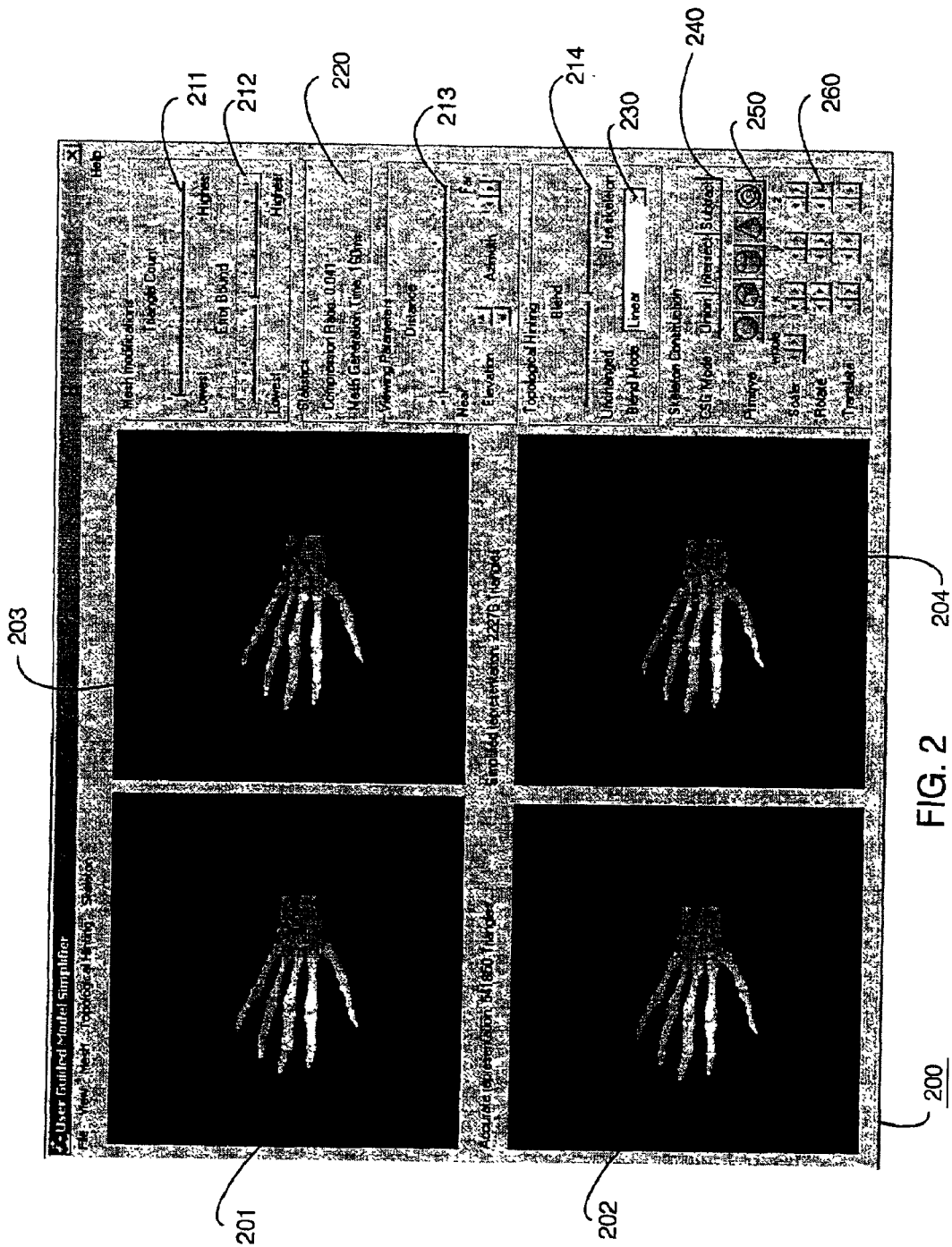
FIG. 2 is a view of a user interface according to the invention.

As shown in FIG. 2, the user interface 200 presents four views 201–204 of the model to be simplified, e.g., a hand. The views 201–202 show the model at the highest resolution (e.g., 541850 triangles), and the two views 203–204 show a current simplified approximation (e.g., 22276 triangles). View 201 and view 203 are shown close up, while view 202 and view 204 are shown at variable distances. Because models with a small number of polygons are usually used to represent the model at a distance, our user interface enables the user to compare the performance of the simplification at various distances.

Viewing and Blending Controls

User controls include slider bars 211–212, respectively for setting the maximum number of triangles permitted to represent the simplified model, and the error bound on the simplified model. These settings control the variable levels-of-detail of the ADFs, and the resulting images displayed in each view. Slider bars and buttons 213 set the distance, elevation, and azimuth at which view 202 and view 204 are shown. Slider bar 214 sets blending parameters. The field 220 shows performance metrics. The pull down menu 230 can be used to select different interpolation techniques for blending, e.g., linear, quadratic, or see Cohen-Or et al., in "Three-dimensional distance field metamorphosis," ACM Transactions on Graphics, 17(2): 116–141, 1998, for other interpolation techniques.

The buttons 240 are used to select CSG operations to be performed on the selected CSG primitives 250. The buttons 260 are used to orient, e.g., scale, rotate, and translate, the primitives with respect to each other and with respect to the original input model.

Interface Operations

When the user is constructing a simple model for the purpose of hinting, all four views 201–204 are dynamically linked, i.e., moving the model in one view also moves the model in the other views. This ensures that comparisons are possible from all possible viewpoints. The user can view the model as vertices, wire-frame, or triangles, with and without smooth shading. In addition, texture mapping can be applied to the model to better judge the results of the simplification.

The user can simplify the input model to lower levels-of-detail in a number of different ways. The user can interactively select the maximum depth of the ADF tree that is traversed in the search for candidate cells during the simplification. The user can also select the maximum acceptable error bound. As these parameters are changed, the above views 201–204 are regenerated.

The system 100 shows the number of triangles in the current approximation, the compression ratio between the current approximation and the original input high-resolution model, and the time required to generate the simplified model. When hinting, the slider bar 214 determines the interpolation point, e.g., halfway, between the original input model and the hint model from which to form the simplified model. It should be noted that the variable levels-of-detail of the views can also be increased over the fixed level-of-detail of the input model by interpolation, or other super-resolution techniques.

Modeling Without a User Interface

As stated above, a number of other applications, such as movies and medicine, require quality images with a large number of polygons, while other applications, for example, those designed for portable devices, are constrained to using a small number of triangles due to processing and memory limitations. Applications that require views of the same model at varying distances, for example, games, can require any number of polygons, depending on their position in a scene.

In the later case, prior art processing limitations require that multiple versions of the characters are pre-stored at various levels-of-detail, especially when the characters are comprised of many polygons. As the characters move in the scene, the pre-stored versions are crudely interpolated and scaled to an appropriate size. This not only increases memory requirements, but also degrades the quality of the appearance of the characters.

With our invention, these problems can be eliminated. First, the ADFs only store what is needed to provide any level of detail or resolution. Second, we only need to store one version of the model. Third, a quality image of the model can be generated in real-time for any of the levels-of-detail.

For example, in a game, the position of characters in the scene control parametrically their variable levels-of-detail. Of course, it could be said, that the joysticks, steering wheels, and buttons of typical video games essentially comprise the "user interface," and the player is the modeler. However, in most complex games, the movement of the characters is also unpredictably constrained and controlled by the game designer in the form of parametric functions, i.e., the program that "runs" the game.

In a movie production system, the modeling of a scene may be entirely parametrically driven as the characters and spacecrafts spiral out-of-control into the far-off universe, or imaginary animals hop through a scene. There, high resolution models are usually constructed by animators using complex and sophisticated modeling systems. These high resolution models can be converted to ADFs, and then the method according to the invention can be applied to these production systems to faithfully and efficiently render the models, at whatever level-of-detail required by the animation.

Topological Hinting

As stated above, many prior art model simplification methods perform poorly at very low polygon counts due to accumulated errors, or poor vertex placement. However, users can often make better subjective decisions as to which geometrical and topological features are important. The present system and method takes advantage of the user's insight.

Therefore, we provide topological hinting. Topological hinting allows the user to generate a "hint" model with the user interface 200. The hint model is used as a guide while converting the complex input model to models with lower resolutions, or different shapes. The user selects the interpolation point between the complex (input) model and the simplified (hint) model. Interpolation is performed quickly, e.g., in the order of milliseconds, and leads to quality models at low resolutions, i.e., models with a relatively small number of polygons, see FIG. 3.

In addition, the user can select which portions of the original input model should stay topologically correct. Most prior art techniques are either inherently topology preserving, or topology deforming. Our invention can do both. The triangulation method is not limited to either maintaining or destroying topology, because it works for any set of cells that completely define the surface of the model.

Figure 4:
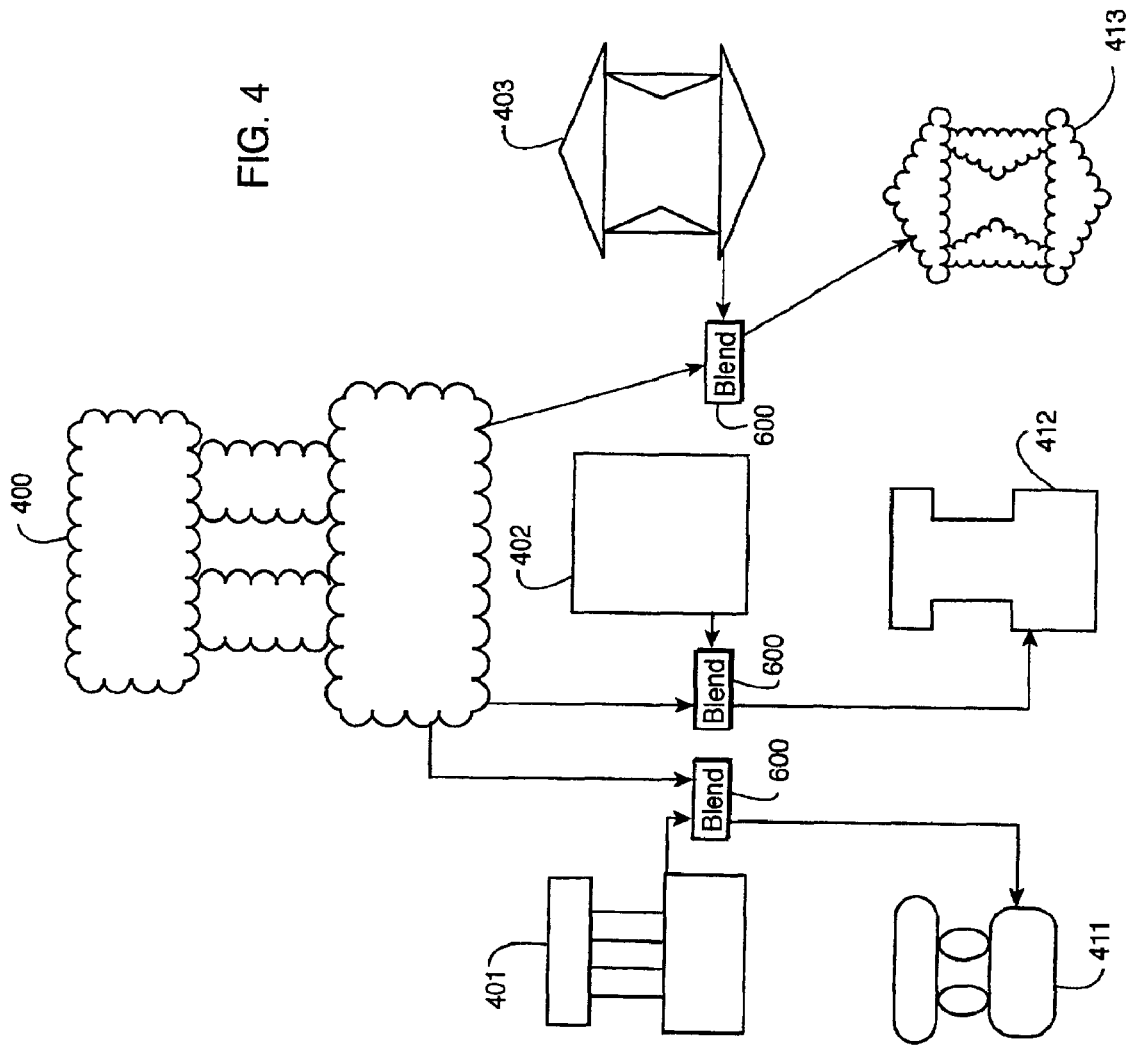
FIG. 4 is a diagram of the original input model and hint models being blended according to the invention.

As shown in FIG. 4, during hint editing, the user constructs one or more CSG "hint" models 401–403 which includes topological and geometrical features of a complex model 400 at what ever of level-of-detail desired. The hint models and complex model are blended 600 with the user interface 200. If the hint model is simple, then the modified model will also be simple. If the hint model includes a lot of detail for certain portions of the complex model, then those details will be preserved during the simplification process. Note, the shape of the hint model can be quite different than the complex model, in which case the blended models 411–413 are a "morph" between the complex and hint models. Note, model simplification can be performed without the user constructing a hint model as described above.

As shown in FIG. 2, the hint model is constructed in one of the views of the user interface 200 while the blended approximation is concurrently displayed in another view. The user provides a model, and a first "model" ADF is generated from the model. The user selects graphics primitives 250, e.g., sphere, box, cylinder, cone, torus. The primitives 250 can be moved, rotated, and scaled to fit the original input model. A second "hint" ADF is generated from combinations of the graphics primitives. The resulting hint ADF is then blended with the model ADF to form a third "blended" ADF. The blended ADF is then converted to triangles using the conversion parameters 112, and displayed by the render engine 140. Note that some of the conversion parameters 112 are specified with the user interface 200, such as the maximum triangle count slider 211 and the error bound slider 212.

The user selects the type of interpolant, e.g., linear, to be used to blend the hint model and the original input model, and can change the interpolant interactively until the desired blend is reached. Real-time topological hinting according to the invention is made possible by the use of ADFs as the shape representation.

Performing object morphing and CSG operations, such as union and intersection, on prior art triangle models is a much more complex procedure, often requiring a large amount of human intervention, and many computational steps, often requiring minutes or hours. As an advantage, CSG operations and blending for ADFs, according to the invention, can be performed in real-time.

It should also be noted that the model and the hint can have different dimensionality. That is, the model can also be reduced in dimensionality or increased in dimensionality according to the hint. For example, a 2D "square" hint can be used to simplify a 3D "cube" model, by first extending the square to a cube form and then using the cube form to guide the simplification of the "cube" model. Similarly, a 3D model can be projected onto a 2D plane, and then a 2D hint can guide the simplification of the 2D projection to form a simplified 2D model.

It should be noted, that the above described interface is but one exemplary embodiment of how to construct a hint. Movie animators may provide hints constructed from other modeling systems, such as MAYA. These hints, after conversion to ADF form, can then be blended with high resolution ADFs, as described above and below, to more efficiently render the frames of a movie. Furthermore, the blending of ADFs can also be used to achieve various special effects, such as the liquid robot in "Terminator 2—Judgment Day."

Figure 5:
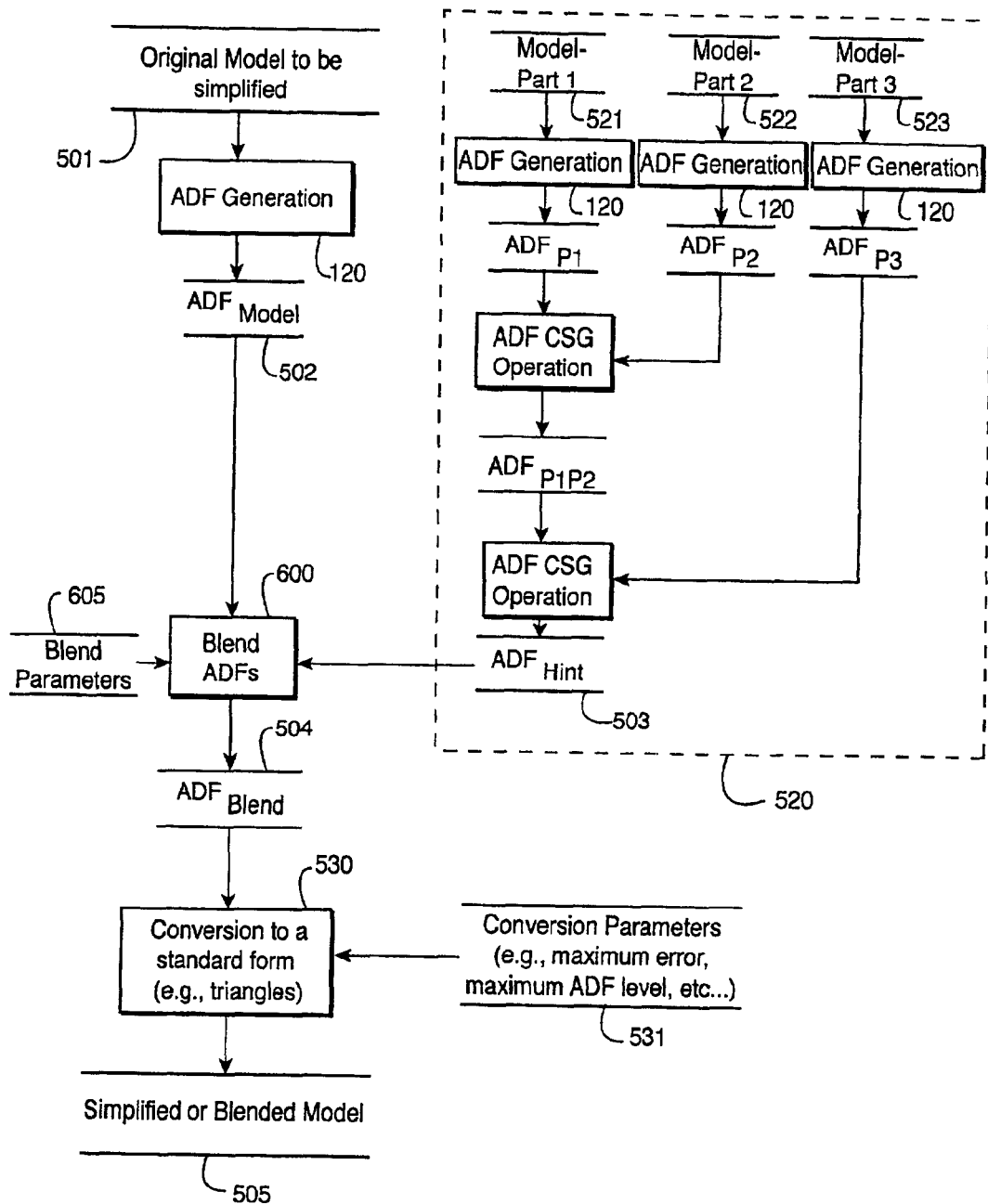
FIG. 5 is a dataflow diagram of topological hinting according to the invention.

FIG. 5 shows the hinting and blending according to the invention. The user supplies an input model 501 to be simplified or blended. A model $ADF_{Model}$ 502 is then generated 120. The user also constructs 520 a hint $ADF_{Hint}$ 503 by assembling and converting various CSG model parts 521–523. The $ADF_{Model}$ 502 and $ADF_{Hint}$ 503 are blended 600 according to the user supplied blending parameters 605 to yield $ADF_{Blend}$ 504. The $ADF_{Blend}$ 504 is then converted 530 to a standard form, e.g., triangles, using conversion parameters 531, and displayed as the simplified or blended model 505. Note, the construction, parameter setting, and rendering happen concurrently to enable interactive modeling.

Figure 6:
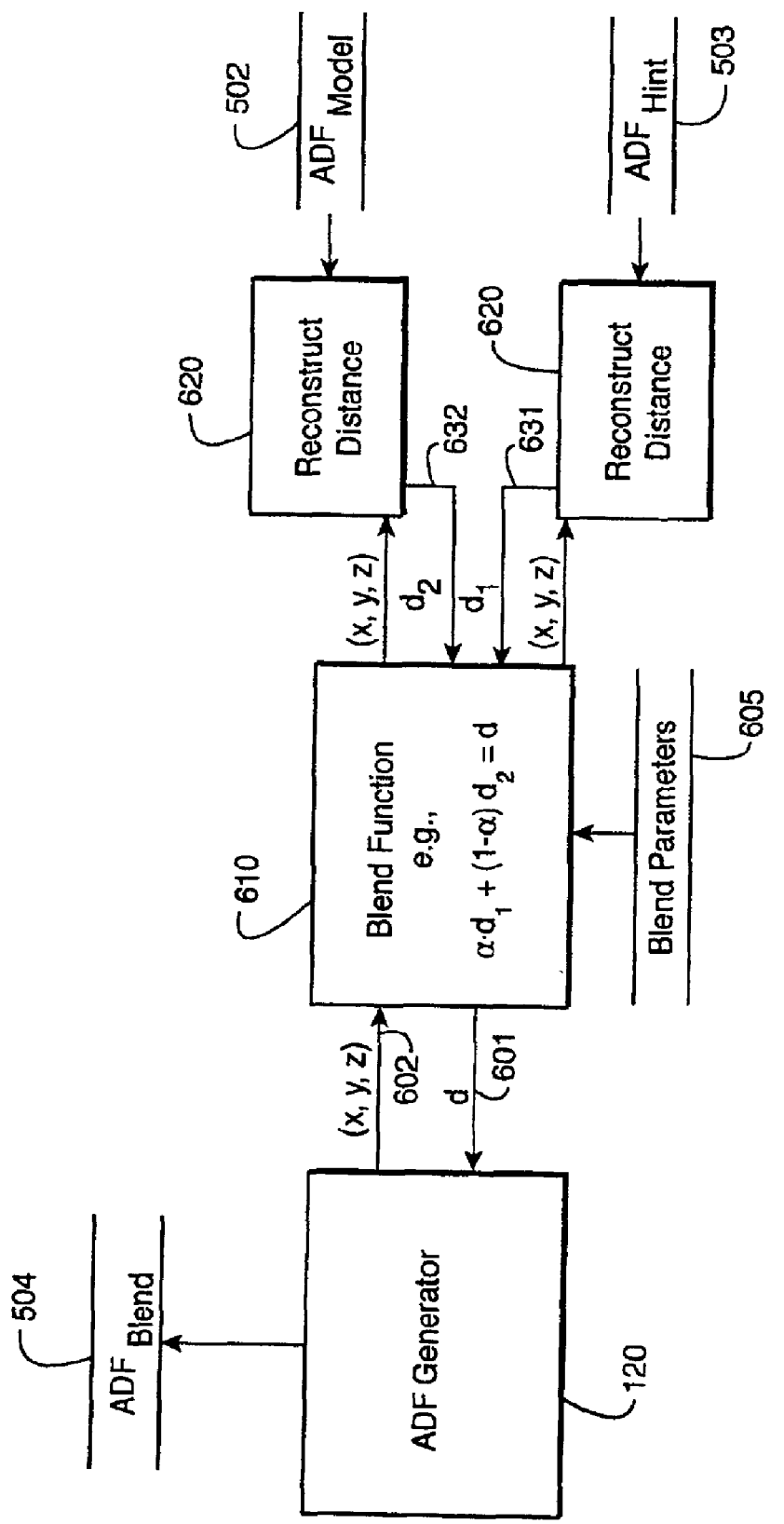
FIG. 6 is a dataflow diagram for blending two ADFs according to the invention.

FIG. 6 shows the blending procedure 600 in greater detail. The ADF generator 120, as described by Perry et al., see above, request a distance d 601 at some query point (x, y, z) 602. A blending function 610 calls twice on a reconstruction function 620 with query point (x, y, z) 602, first for $ADF_{Model}$ 502, and second for $ADF_{Hint}$ 503, to obtain distances $d_1$ 631 and $d_2$ 632, respectively. The two distances $d_1$ 631 and $d_2$ 632 are then blended according to some blend function 610 with associated user supplied blending parameters 605 to return distance d 601 to be used by the ADF generator 120 in constructing the $ADF_{Blend}$ 504. Note, blending can work in any number of dimensions, e.g., for blending two-dimensional letterform shapes, four-dimensional color gamuts, or hyper-dimensional models of complex physical systems such as climate, astronomy, and nuclear reactions.

The modeling system and method as disclosed herein provide a wider range of input geometry than prior art techniques, which often only work on triangle meshes. Mesh generation speed is dependent on the number of triangles in the approximation, and not the input mesh, to allow faster simplification, especially from large input models. Accurate vertex and normal reconstruction is not constrained by the placement of the vertices in the input mesh, as in the prior art. The invention also provides a good error bound for the distance to the model's surface, which is a simple reconstruction of the distance field at the point of interest.

In addition to the advantages of using ADFs, we have described a user guided approach to level-of-detail modeling. The user is provided with the ability to modify the approximation of the object with feedback in real-time.

The user can control a range of approximations starting with an input model. Topological hinting is described as a method to overcome the problems faced when generating very low polygon approximations of the input model. Topological hinting allows the user to create a CSG hint model which can then be blended with the original input model to generate simpler and better approximations that retain only the topological and geometrical features that the user considers important.

Using ADFs with Decimation And Refinement Methods

ADFs can also be used to enhance decimation and refinement methods. For example, by first converting the original input model to an ADF, decimation and refinement methods can then use the ADF in the following ways. First, the distance and gradient for any vertex can be reconstructed from the ADF to better guide vertex placement on the surface of the input model. Second, the reconstructed gradient can also be used to determine an accurate normal at the specified vertex. Third, the reconstructed distance at the specified vertex can be used as an error bound, thereby eliminating the compounding of errors typical in many decimation and refinement methods. Fourth, topological hints can be used to achieve better approximations at low polygon counts. Because many decimation and refinement methods can simplify only polygon models, the use of ADFs with those methods can significantly expand their ability to deal with more diverse input forms, such as range data and Bezier patches, by first converting the input form to an ADF and then using the ADF to guide the placement of vertices as described above.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for modeling a plurality of graphics models, comprising:

generating a first adaptively sampled distance field for a first model;

generating a second adaptively sampled distance field for a second model;

sampling locations in the first adaptively sampled distance field to determine a distance value for each location;

sampling the second adaptively sampled distance field at each location to determine a corresponding feature of the second adaptively sampled distance field for each location; and modifying each distance value according to the corresponding feature to determine a second distance value for each location.

2. The method of claim 1 further comprising:

generating a third adaptively sampled distance field from the modified distance values.

3. The method of claim 2 further comprising:

rendering the third adaptively sampled distance field.

4. The method of claim 1 wherein the feature is a distance value of the second adaptively sampled distance field, and further comprising:

combining the first distance value with the distance value of the second adaptively sampled distance field to determine the third distance value.

5. The method of claim 4 wherein the combining is according to a blending function to blend the first and second models.

6. The method of claim 1 wherein the plurality of models have more than two dimensions.

7. The method of claim 1 wherein at least one model is a two-dimensional glyph.

8. The method of claim 1 wherein at least one model is a four-dimensional color gamut.

9. The method of claim 1 wherein at least one model is a hyper-dimensional physical system model.

10. The method of claim 1 or claim 2 wherein the generating comprises defining a candidate cell of the adaptively sampled distance field, determining and storing distance values of the candidate cell in a bounded distance tree, recursively subdividing the candidate cell into subdivided cells of the adaptively sampled distance field while determining and storing corresponding distance values of the subdivided cells in the bounded distance tree until a termination condition is reached, and appending the distance values to the corresponding cells to generate the adaptively sampled distance field of the object.

* * * * *